Patented June 12, 1945

2,378,197

UNITED STATES PATENT OFFICE 2,378,197

PREPARATION OF DIVINYL BENZENE PRODUCTS

Gaetano F. D'Alelio, Pittsfield, Mass., assignor to General Electric Company, a corporation of New York No Drawing. Application June 23, 1942, Serial No. 448,159

4 Claims. (Cl. 260—78)

This invention relates to the preparation of synthetic resin compositions and more particularly to the preparation of heat-convertible, soluble, fusible copolymers of divinyl benzene in a dialkyl benzene having at least two carbon atoms in each alkyl grouping, and at least one other compound containing a plurality of non-conjugated

groupings.

It is known that polymerization of compounds possessing more than one terminal

grouping, providing the system is not conjugated, results in the formation of a cross-linked, insoluble, infusible polymer. Examples of such compounds are glycol dimethacrylate, diallyl succinate, diallyl phthalate, diallyl maleate, allyl acrylate, diallyl oxalate, dimethallyl ether, etc. Divinyl benzene polymerized in the usual manner acts in the same fashion. When this compound is polymerized, an insoluble, very hard, infusible, nonworkable mass is obtained. Copolymers of divinyl benzene, which are known, are insoluble and infusible.

Although the copolymeric products of this invention are fusible and soluble, it is a unique property of these copolymers that they possess heat-convertibility and may, therefore, be converted to an infusible, insoluble material.

I have now discovered that divinyl benzene and at least one other compound containing a plurality of non-conjugated

groupings may be partially copolymerized to yield a soluble and fusible, heat-convertible mass, thus making available for commercial use a product heretofore inapplicable, since, once formed, it could not be molded or shaped due to its infusibility. The process by which a soluble fusible copolymer of divinyl benzene may be isolated from a dialkyl benzene having at least two carbon atoms in each alkyl grouping comprises polymerizing the solution of divinyl benzene and at least one other compound containing a plurality of non-conjugated

groupings in a dialkyl benzene in the presence of both an inhibitor and a catalyst of polymerization for a time less than that required to cause separation of the copolymer. The dissolved copolymer is then precipitated by the addition of a non-solvent or by evaporation of the volatile constituents.

Present production of divinyl benzene (monomer) is carried out in such a manner that the resulting product is an inseparable mixture of about 20-30% divinyl benzene in diethyl benzene. This new and novel process is of special interest because it utilizes the inseparable mixture for which there has been no use up until the present time.

Extensive experiments carried out on the polymerization of divinyl benzene in a dialkyl benzene indicate that an insoluble, infusible resin is obtained as a gel when ordinary polymerization methods are employed. This gel formation or precipitation takes place in a very short time, e. g., 15-20 minutes. The extreme sensitivity of this resin precludes its use in industrial applications. By means of this invention I may cause the copolymer to be formed at a much slower rate, thus providing a greater permissible deviation from any calculated time required to give a maximum yield of partial polymer. The time required depends upon the type as well as the amount of inhibitor and catalyst present in the solution. I have found that, by varying my conditions, a partially polymerized product may be obtained in a controlled period of time.

The actual copolymerization of the divinyl benzene in its solution in a dialkyl benzene is carried out as previously indicated in the presence of both a catalyst and an inhibitor of polymerization. Any suitable method may be employed. However, I prefer to cause polymerization under the influence of external heat in the presence of an inhibitor and catalyst for a period substantially less than that required to cause gelation of the solution. For purposes of economy and convenience I prefer to use reflux temperature and atmospheric pressure although other elevated temperatures and pressures ranging from subatmospheric to superatmospheric pressure may be used. The copolymer of divinyl benzene and at least one other compound containing a plurality of non-conjugated $$CH_2=C\diagup$$

groupings may be precipitated from the dialkyl benzene by the addition of some non-solvent, e. g., methyl alcohol, ethyl alcohol, glycol, etc.

For polymerization catalysts in the polymerization of divinyl benzene I may use ozone, ozonides, inorganic super oxides such as barium peroxide, sodium peroxide, etc., aliphatic acyl peroxides, e. g., acetyl peroxide, lauryl peroxide, stearyl peroxide, etc., peroxides of the aromatic acid series, e. g., benzoyl peroxide, etc., ketone peroxides, e. g., acetone peroxide, triacetone peroxide, alkyl derivatives of hydrogen peroxide, e. g., ethyl hydrogen peroxide, diethyl peroxide, etc., mixed organic peroxides, e. g., acetyl benzoyl peroxide, etc., various per compounds such as perborates, persulfates, perchlorates, etc., aluminum salts such as the halides, e. g., aluminum chloride, organic and inorganic acids such as methacrylic, hydrofluoric, etc., metal compounds of the unsaturated acids as, for instance, cobalt and manganese resinates, linoleates, maleates, etc., hydrogen peroxide, etc. However, benzoyl peroxide is a preferred catalyst. Any suitable amount of catalyst may be used but, in general, the catalyst concentration will be within the range of 0.1–2.0% by weight of divinyl benzene.

As inhibitors in the preparation of the soluble, fusible copolymers of this invention I may use alkyl derivatives such as allyl chloride, allyl alcohol, methallyl chloride, methallyl alcohol and others which are more fully disclosed in my copending application, Serial No. 448,155, filed concurrently herewith and assigned to the same assignee as the present invention. Or I may use carbon tetrachloride as more fully described in my copending application, Serial No. 448,157, filed concurrently herewith and assigned to the same assignee as the present invention. Or, I may use a copper inhibitor as more fully described in my copending application, Serial No. 448,158, filed concurrently herewith and assigned to the same assignee as the present invention, which application has matured into Patent 2,363,836 dated Nov. 28, 1944.

Many compounds having a plurality of non-conjugated

groupings may be copolymerized with the divinyl aryl compound. A few illustrative compounds are: unsaturated alcohol esters of unsaturated monocarboxylic acids (e. g., allyl acrylate, methallyl acrylate, allyl methacrylate, methallyl methacrylate, allyl ethacrylate, chlorallyl acrylate, chlorallyl chloracrylate, etc.), unsaturated alcohol poly-esters of saturated aliphatic and aromatic polycarboxylic acids (e. g., diallyl phthalate, diallyl oxalate, dimethallyl oxalate, diallyl succinate, dimethallyl tartrate, diallyl terephthalate, etc.), ethers (e. g., divinyl ether, diallyl ether, vinyl allyl ether, dimethallyl ether, etc.), ketones (e. g., divinyl ketone, diallyl ketone, dimethallyl ketone, etc.). Additional examples are disclosed in my U. S. Patent 2,260,005, dated October 21, 1941.

In order that those skilled in the art better may understand how the present invention may be carried into effect, the following illustrative examples are given. All parts are by weight.

*Example 1*

| | Parts by weight |
|---|---|
| Divinyl benzene (87 parts of 23% sol'n. in diethyl benzene) | 20 |
| Diallyl ether | 30 |
| Carbon tetrachloride | 50 |
| Benzoyl peroxide | 0.5 |

The above ingredients were refluxed 100 minutes and then poured into methanol. The precipitate was thoroughly triturated under methanol, dried and ground to a fine powder. The yield was 23 parts. The partial copolymer obtained was fusible on a hot plate at 140° C. and soluble in toluene and styrene.

*Example 2*

| | Parts by weight |
|---|---|
| Divinyl benzene (108 parts of 23% sol'n. in diethyl benzene) | 25 |
| Diallyl phthalate | 25 |
| Carbon tetrachloride | 50 |
| Benzoyl peroxide | 0.5 |

The above ingredients were refluxed 100 minutes and poured into methanol. The precipitate was thoroughly triturated under methanol, dried and ground to a fine powder. The yield was 24 parts. The partial copolymer obtained was fusible on a hot plate at 140° C. and soluble in toluene and styrene.

What I claim as new and desire to secure by Letters Patent of the United States is:

1. A composition comprising a heat-convertible, fusible partial copolymer of divinyl benzene and a compound of the class consisting of allyl, methallyl and chlorallyl alcohol esters of unsaturated monocarboxylic acids; allyl and methallyl unsaturated alcohol polyesters of saturated aliphatic and aromatic polycarboxylic acids; unsaturated ethers and unsaturated ketones, said compound containing a plurality of non-conjugated

groupings.

2. A composition comprising a heat-convertible, fusible, partial copolymer of divinyl benzene and diallyl ether.

3. A composition comprising a heat-convertible, fusible partial copolymer of divinyl benzene and diallyl phthalate.

4. The process of preparing a heat-convertible, fusible partial copolymer of divinyl benzene and a compound of the class consisting of allyl, methallyl and chlorallyl alcohol esters of unsaturated monocarboxylic acids; allyl and methallyl unsaturated alcohol polyesters of saturated aliphatic and aromatic polycarboxylic acids; unsaturated ethers and unsaturated ketones, said compound containing a plurality of non-conjugated

groupings, which comprises reacting the reactants in a solution of a dialkyl benzene having at least two carbon atoms in each alkyl grouping under heat for a period substantially less than is required for gellation, in the presence of an added polymerization catalyst and carbon tetrachloride, and isolating the partially copolymerized product so produced.

GAETANO F. D'ALELIO.